United States Patent
Girard et al.

(10) Patent No.: US 9,532,223 B2
(45) Date of Patent: Dec. 27, 2016

(54) METHOD FOR DOWNLOADING A SUBSCRIPTION FROM AN OPERATOR TO A UICC EMBEDDED IN A TERMINAL

(75) Inventors: Pierre Girard, La Destrousse (FR); Philippe Proust, Marseilles (FR)

(73) Assignee: GEMALTO SA, Meudon (FR)

( * ) Notice: Subject to any disclaimer, the term of this patent is extended or adjusted under 35 U.S.C. 154(b) by 357 days.

(21) Appl. No.: 13/991,912

(22) PCT Filed: Dec. 6, 2011

(86) PCT No.: PCT/EP2011/071919
§ 371 (c)(1),
(2), (4) Date: Aug. 22, 2013

(87) PCT Pub. No.: WO2012/076525
PCT Pub. Date: Jun. 14, 2012

(65) Prior Publication Data
US 2013/0324091 A1 Dec. 5, 2013

Related U.S. Application Data

(63) Continuation-in-part of application No. 13/312,309, filed on Dec. 6, 2011, now Pat. No. 9,301,145.

(51) Int. Cl.
*H04M 1/66* (2006.01)
*H04W 12/08* (2009.01)
(Continued)

(52) U.S. Cl.
CPC ............... *H04W 12/08* (2013.01); *G06F 8/61* (2013.01); *H04B 1/3816* (2013.01);
(Continued)

(58) Field of Classification Search
CPC .. H04W 4/001; H04W 12/08; H04W 36/0038; H04W 76/041; H04W 12/00; H04L 63/0428; H04L 2463/082
See application file for complete search history.

(56) References Cited

U.S. PATENT DOCUMENTS 6,978,152 B1 * 12/2005 Yamaashi et al. ............ 455/526
7,024,390 B1    4/2006 Mori et al.
(Continued)

FOREIGN PATENT DOCUMENTS

CN    101080051 A    11/2007
CN    101179401 A    5/2008
(Continued)

OTHER PUBLICATIONS

Office Action (Notice of Reasons for Rejection) issued on Aug. 19, 2014, by the Japan Patent Office in Japanese Patent Application No. 2013-542497, and an English Translation of the Office Action. (9 pages).
(Continued)

*Primary Examiner* — Mazda Sabouri
*Assistant Examiner* — Edward Zhang
(74) *Attorney, Agent, or Firm* — Buchanan Ingersoll & Rooney PC

(57) ABSTRACT

The present invention relates to a method for downloading a subscription from an operator to a UICC embedded in a terminal. The method includes transmitting from the terminal, to a platform, an identifier and a request for downloading the subscription; verifying in the platform that the terminal is authorized to download the subscription by verifying the rights of the terminal in accordance with its identifier; and downloading the subscription to the UICC if the rights are confirmed and, otherwise, refusing to download the subscription.

4 Claims, 3 Drawing Sheets

(51) Int. Cl.

| | | |
|---|---|---|
| H04W 8/24 | (2009.01) | |
| H04W 12/10 | (2009.01) | |
| G06F 9/445 | (2006.01) | |
| H04W 4/00 | (2009.01) | |
| H04W 8/20 | (2009.01) | |
| H04W 12/04 | (2009.01) | |
| H04L 29/06 | (2006.01) | |
| H04W 12/06 | (2009.01) | |
| H04L 29/08 | (2006.01) | |
| H04L 9/08 | (2006.01) | |
| H04W 8/22 | (2009.01) | |
| H04B 1/3816 | (2015.01) | |
| H04W 8/18 | (2009.01) | |
| H04W 84/04 | (2009.01) | |

(52) U.S. Cl.
CPC ........ *H04L 9/0825* (2013.01); *H04L 63/0428* (2013.01); *H04L 63/083* (2013.01); *H04L 63/123* (2013.01); *H04L 67/34* (2013.01); *H04W 4/001* (2013.01); *H04W 4/003* (2013.01); *H04W 4/005* (2013.01); *H04W 8/183* (2013.01); *H04W 8/205* (2013.01); *H04W 8/22* (2013.01); *H04W 8/245* (2013.01); *H04W 12/04* (2013.01); *H04W 12/06* (2013.01); *H04W 12/10* (2013.01); *H04W 8/18* (2013.01); *H04W 84/04* (2013.01)

(56) References Cited

U.S. PATENT DOCUMENTS

| | | |
|---|---|---|
| 7,146,161 B2 | 12/2006 | Chou |
| 7,349,719 B2 | 3/2008 | Buniatyan |
| 7,363,056 B2 | 4/2008 | Faisy |
| 9,092,775 B2 | 7/2015 | Bernard et al. |
| 2002/0186845 A1 | 12/2002 | Dutta et al. |
| 2004/0131186 A1 | 7/2004 | Kasuya et al. |
| 2004/0235523 A1 | 11/2004 | Schrire et al. |
| 2004/0242209 A1* | 12/2004 | Kruis .............. H04W 4/001 455/414.1 |
| 2005/0021875 A1 | 1/2005 | Bouthemy et al. |
| 2005/0164737 A1 | 7/2005 | Brown |
| 2005/0186954 A1 | 8/2005 | Kenney |
| 2005/0239504 A1 | 10/2005 | Ishii et al. |
| 2005/0266883 A1 | 12/2005 | Chatrath |
| 2005/0279826 A1 | 12/2005 | Merrien |
| 2006/0049243 A1 | 3/2006 | Sakamura et al. |
| 2006/0079284 A1 | 4/2006 | Lu et al. |
| 2006/0086785 A1 | 4/2006 | Sakata |
| 2006/0196931 A1 | 9/2006 | Holtmanns et al. |
| 2006/0199614 A1 | 9/2006 | Hyacinthe |
| 2007/0105532 A1 | 5/2007 | Martin et al. |
| 2007/0239857 A1 | 10/2007 | Mahalal et al. |
| 2008/0090614 A1 | 4/2008 | Sicher et al. |
| 2008/0130879 A1 | 6/2008 | Heinonen et al. |
| 2008/0261561 A1 | 10/2008 | Gehrmann |
| 2008/0292074 A1 | 11/2008 | Boni et al. |
| 2008/0319823 A1 | 12/2008 | Ahn et al. |
| 2009/0159692 A1 | 6/2009 | Chew et al. |
| 2009/0163175 A1 | 6/2009 | Shi et al. |
| 2009/0191857 A1 | 7/2009 | Horn et al. |
| 2009/0191917 A1 | 7/2009 | Zappulla et al. |
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0035587 A1* | 2/2010 | Bennett .............. H04L 67/34 455/414.1 |
| 2010/0179907 A1 | 7/2010 | Atkinson |
| 2011/0028126 A1* | 2/2011 | Lim et al. ............. 455/411 |
| 2011/0035584 A1 | 2/2011 | Meyerstein et al. |
| 2011/0059773 A1 | 3/2011 | Neumann et al. |
| 2011/0081950 A1 | 4/2011 | Guven |
| 2011/0126183 A1 | 5/2011 | Bernard et al. |
| 2011/0136482 A1 | 6/2011 | Kaliner |
| 2011/0237190 A1 | 9/2011 | Jolivet |
| 2011/0302641 A1 | 12/2011 | Hald et al. |
| 2011/0320600 A1 | 12/2011 | Froeding et al. |
| 2012/0028609 A1 | 2/2012 | Hruska |
| 2012/0108295 A1 | 5/2012 | Schell et al. |
| 2012/0113865 A1 | 5/2012 | Zhao et al. |
| 2012/0190354 A1 | 7/2012 | Merrien et al. |
| 2012/0297473 A1 | 11/2012 | Case et al. |
| 2013/0318355 A1 | 11/2013 | Girard et al. |
| 2013/0329683 A1 | 12/2013 | Berard et al. |
| 2014/0019760 A1 | 1/2014 | Vergnes et al. |
| 2014/0024343 A1 | 1/2014 | Bradley |
| 2014/0031083 A1 | 1/2014 | Vergnes et al. |
| 2014/0057680 A1 | 2/2014 | Proust et al. |
| 2014/0066011 A1 | 3/2014 | Bradley |
| 2014/0122872 A1 | 5/2014 | Merrien et al. |
| 2014/0141747 A1 | 5/2014 | Merrien et al. |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |
| GB | 2 457 221 A | 8/2009 |
| JP | 2002-236572 A | 8/2002 |
| JP | 2005-323128 A | 11/2005 |
| JP | 2006-050554 A | 2/2006 |
| JP | 2006-107316 A | 4/2006 |
| JP | 2007-019897 A | 1/2007 |
| JP | 2007-513534 A | 5/2007 |
| JP | 2007-201883 A | 8/2007 |
| JP | 2007-235492 A | 9/2007 |
| JP | 2008-131469 A | 6/2008 |
| JP | 2008-519343 A | 6/2008 |
| JP | 2009-037602 A | 2/2009 |
| JP | 2009-038598 A | 2/2009 |
| JP | 2010-501092 A | 1/2010 |
| JP | 2010-532107 A | 9/2010 |
| JP | 2011-525311 A | 9/2011 |
| JP | 2012-528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2004/105421 A2 | 12/2004 |
| WO | 2007/058241 A1 | 5/2007 |
| WO | 2008/128874 A1 | 10/2008 |
| WO | WO 2008/123827 A1 | 10/2008 |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | WO 2009/103623 A2 | 8/2009 |
| WO | WO2009103623 A2 * | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010/068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |

(56) References Cited

FOREIGN PATENT DOCUMENTS

| WO | 2012058099 A1 | 5/2012 |
|---|---|---|
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

Office Action (Notice of Preliminary Rejection) issued on Jun. 27, 2014, by the Korean Intellectual Property Office, in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).
Office Action (Notice of Reasons for Rejection) issued on Aug. 5, 2014, by the Japan Patent Office in Japanese Patent Application No. 2013-542474, and an English Translation of the Office Action. (4 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Notice of Allowance issued by the U.S. Patent and Trademark Office in the U.S. Appl. No. 13/991,752, mailed Jan. 21, 2015, U.S. Patent and Trademark Office, Alexandria, VA. (30 pages).
English translation of Office Action issued by the Korean Patent Office on Aug. 28, 2014 in corresponding Korean Application No. 10-2013-7016004. (3 pages).
English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the Milenage Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority.(Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Jun. 17, 2014, by the Japan Patent Office in the Japanese Patent Application No. 2013-542492. (3 pages).
Madlmayr et al., "The Benefit of using SIM Application Toolkit in the Context of Near Field Communication Applications" International Conference on the Management of Mobile Business, (Jul. 2007), (8 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
International Search Report (Form PCT/ISA/210) and the Written Opinion of the International Searching Authority (Form PCT/ISA/237) issued on Mar. 28, 2012, by the European Patent Office in the International Application No. PCT/EP2011/071737. (6 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
International Search Report (Form PCT/ISA/210) and the Written Opinion of the International Searching Authority(Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
"Smart Cards; Card Application Toolkit (CAT) (Release 9)", ETSI TS 102 223, vol. SCP TEC, No. V9.2.0, (Oct. 1, 2010), pp. 1-209.
International Search Report (Form PCT/ISA/210) and the Written Opinion of the International Searching Authority(Form PCT/ISA/237) issued on Feb. 22, 2012, by the European Patent Office in the International Application No. PCT/EP2011/071675. (12 pages).
International Search Report (PCT/ISA/210) Issued on Apr. 16, 2012, by the European Patent Office as the International Searching Authority for International Application No. PCT/EP2011/071919.
Written Opinion (PCT/ISA/237) issued on Apr. 16, 2012, by the European Patent Office as the International Searching Authority for International Application No. PCT/EP2011/071919.

(56) References Cited

OTHER PUBLICATIONS

European Search Report issued Jul. 22, 2011 for European Application No. 10306359.
Office Action issued by the U.S. Patent and Trademark Office in the U.S. Appl. No. 13/991,766, mailed Mar. 17, 2015, U.S. Patent and Trademark Office, Alexandria, VA. (33 pages).
Office Action issued by the U.S. Patent and Trademark Office in the U.S. Appl. No. 13/992,039, mailed Mar. 17, 2015, U.S. Patent and Trademark Office, Alexandria, VA. (35 pages).
Office Action (Notice of Preliminary Rejection) issued on Feb. 25, 2015, by the Korean Patent Office in Korean Patent Application No. 10-2013-0717638, and an English Translation of the Office Action. (7 pages).
Office Action issued by the U.S. Patent and Trademark Office in the U.S. Appl. No. 13/991,766, mailed Oct. 1, 2015, U.S. Patent and Trademark Office, Alexandria, VA. (27 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 13/991,846, mailed Oct. 15, 2015, U.S. Patent and Trademark Office, Alexandria, VA. (23 pages).
Office Action issued by the U.S. Patent and Trademark Office in the U.S. Appl. No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action (17 pages).
Office Action issued Nov. 17, 2015 by the Chinese Patent Office in corresponding Chinese Patent Application No. 201180058925.6 (10 pages).
Office Action issued by the U.S. Patent and Trademark Office in U.S. Appl. No. 13/992,103, mailed Nov. 25, 2015, U.S. Patent and Trademark Office, Alexandria, VA (22 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
Office Action (Notice of Reasons for Rejection) issued on Feb. 2, 2016, by the Japanese Patent Office in Japanese Patent Application No. 2015-018547, and an English Translation of the Office Action. (5 pages).
Office Action issued by the U.S. Patent and Trademark Office in the U.S. Appl. No. 13/992,103, mailed Mar. 30, 2016, U.S. Patent and Trademark Office, Alexandria, VA. (15 pages).
Office Action issued by the U.S. Patent and Trademark Office in the U.S. Appl. No. 13/991,846, mailed Apr. 5, 2016, U.S. Patent and Trademark Office, Alexandria, VA. (24 pages).
Office Action issued on Jan. 19, 2016, by the European Patent Office in European Patent Application No. 11 811 335.6 (4 pages).
3rd Generation Partnership Project; Technical Specification Group Services and System Aspects; Feasibility study on the security aspects of remote provisioning and change of subscription for Machine to Machine (M2M) equipment (Release 9); 3GPP Draft; 33812-920, published by the 3rd Generation Partnership Project (3GPP) in Sophia-Antipolis Cedex, France on Jun. 22, 2010 (87 pages).
3GPP TS 22.101 V11.0.0 (Sep. 2010), Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 835.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln No. 2013-054275 with English translation (14 pages).
U.S. Office Action dated Feb. 1, 2016 issued in corresponding U.S. Appl. No. 13/991,823 (15 pages).
U.S. Office Action dated Feb. 2, 2016 issued in corresponding U.S. Appl. No. 13/992,039 (24 pages).
U.S. Office Action dated Feb. 10, 2016 issued in corresponding U.S. Appl. No. 13/992,065 (23 pages).

\* cited by examiner

METHOD FOR DOWNLOADING A SUBSCRIPTION FROM AN OPERATOR TO A UICC EMBEDDED IN A TERMINAL

This disclosure is a national phase of PCT/EP2011/071919, filed Dec. 6, 2011, a continuation-in-part of U.S. application Ser. No. 13/312,309, filed Dec. 6, 2011, and claims priority to European Application No. 10306359.0, filed Dec. 6, 2010, the disclosures of which are hereby incorporated by reference.

The present invention concerns a method for downloading a subscription from an operator to a UICC (Universal Integrated Circuit Card) embedded in a terminal. It generally relates to the management of secure elements, like UICCs embedding Sim applications, these secure elements being installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an UICC.

This disclosed invention applies to such soldered UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The invention concerns simlock and applies to UICCs that are not removable from terminals (embedded UICCs), for example mobile terminals.

Mobile network operators (MNOs) often propose cheap mobile terminals to their subscribers and they do not want them to take subscriptions from other operators, at least for a given period of time after they have bought a new terminal. Therefore, operators lock new sold mobile terminals to their network, to be sure that they will only work on their networks, thanks to UICCs belonging to these operators.

It is however easy for an unfaithful user to desimlock his mobile terminal. Some shops propose for small amounts of money to desimlock recently bought mobile terminals. The desimlocked terminal can then be used on the network of another operator. This represents an important loss of money for the mobile operators since they have sold the terminals with an important discount price in exchange of the fidelity of their subscribers.

The present invention is in particular applicable to mobile terminals comprising an embedded UICC (not removable) which can store at least two subscriptions, one for a MNO#1 (primary MNO who has sold the terminal) and another one, let's say for a MNO#2. MNO#1 who has locked the terminal on his network does not want that the user installs another subscription from another operator on his UICC. This would permit to the user to use his mobile terminal with this other subscription with MNO#2, instead with the subscription with MNO#1.

The present invention proposes a solution to this problem.

The present invention proposes a method for downloading a subscription from an operator to a UICC embedded in a terminal, the method consisting in:

transmitting from the terminal to a platform an identifier and a request for downloading the subscription;

verifying in the platform that the terminal is authorized to download the subscription by verifying the rights of the terminal thanks to its identifier;

downloading the subscription to the UICC if the rights are confirmed and, otherwise, refusing to download the subscription.

The verification preferably consists in comparing the identifier with a list of subscriptions for which a download is authorized.

The identifier is an identifier of the terminal or an identifier of the UICC.

DETAILED DESCRIPTION

Figure 1:
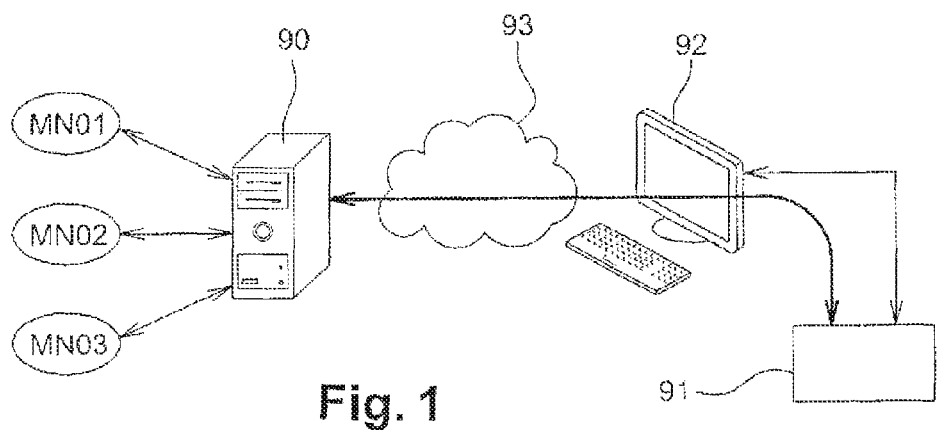
FIG. 1 is a schematic illustration of a first embodiment of a networked system in which the invention can be implemented.
Figure 2:
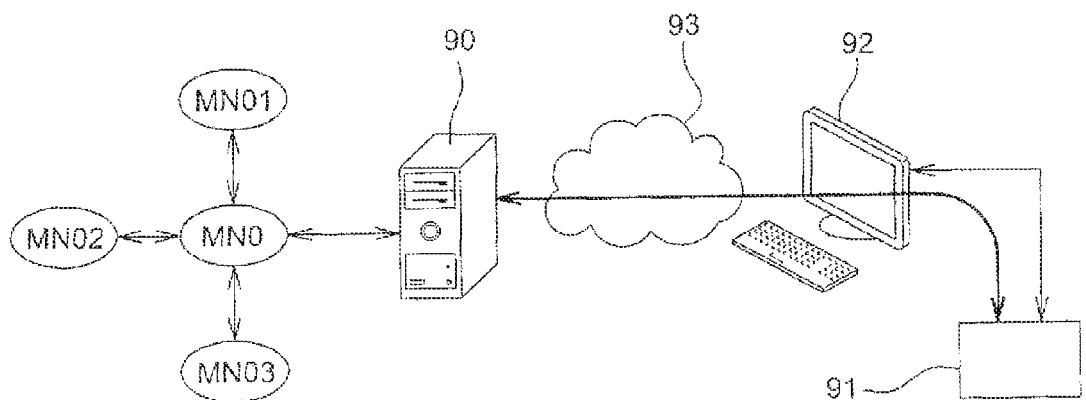
FIG. 2 is a schematic illustration of a second embodiment of a system in which the invention can be implemented.

The present invention takes place in a system similar to FIGS. 1 and 2.

In FIG. 1, a central server 90 manages subscriptions stored in a UICC 91 comprised in a terminal 92. The central server 90 manages these subscriptions through a network 93, for example Internet. Central server 90 is connected to different telecommunication networks of operators MNO1 to MNO3.

In another configuration of the system, represented in FIG. 2, the central server is connected to a single operator's network (MNO) and communicates with the other networks MNO1 to MNO3 through this network MNO.

Central server 90 can act as a manager of the subscriptions present on UICC 91. He can for example install a new subscription on the UICC, at the request of the user of terminal 92.

These systems allow a user that has lost his terminal to contact a single entity, the central server 90, in order to ask to this entity to manage its subscriptions. Such a management of subscriptions can for example consist in:
 Temporarily or definitively block one or several subscriptions;
 Temporarily or definitively block one or several services from one or several subscriptions;
 Send short messages to try to warn the person handling the terminal;
 Geo-localize the terminal;
 Recovery of the data on the device and the UICC;
 Deleting or encrypting the data present on the terminal;
 Selecting a specific application that will allow to re-activate one of several subscriptions if the terminal is recovered.

This management also applies in case of a stolen terminal.

Figure 3:
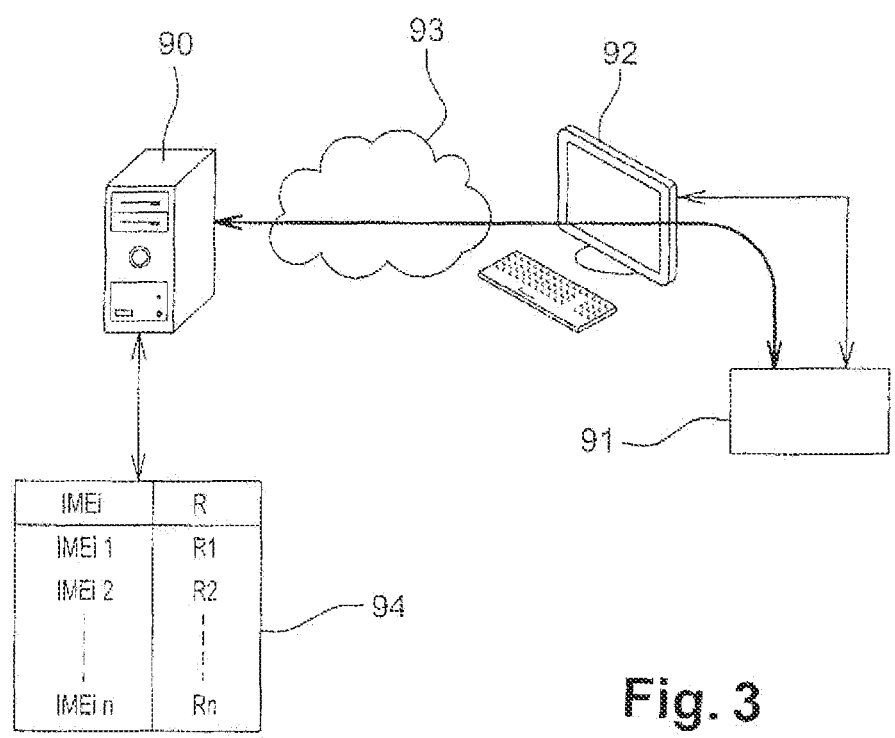
FIGS. 3-5 illustrate steps that are performed in the system in accordance with the principles of the invention.

The invention will be better understood in reference to FIG. 3 that represents a system according to the present invention.

The system of FIG. 3 is similar to the system of FIGS. 1 and 2 already described.

According to this invention, in order to download a subscription in the UICC 91, the terminal 92 sends a request for downloading the subscription to the central server 90, this request comprising an identifier of the terminal 92 or an identifier of the UICC 91. The central server 90 comprises a list 94 of all the identifiers of the terminals or UICC that can be managed by this server 90.

The list 94 comprises for each identifier (here the IMEI of the terminal 90) corresponding rights R. To an identifier IMEI1 are associated rights R1. The server 90 verifies that a terminal (UICC) making such a request for downloading a subscription has the right to download this subscription. If the rights are confirmed, the subscription is downloaded to the UICC. If the rights are not allowed, the subscription is not downloaded.

The UICC can comprise a bootstrap subscription allowing a first connexion to the server, in order to download a real subscription afterwards.

Normally, the sold UICC already comprises a subscription to a first MNO and is locked to this operator. The operator can inform the central server 90 when locking is no more necessary and the list 94 is then updated in order to allow the customer to download another subscription.

Instead of verifying the rights associated to a terminal, the rights associated to a UICC can be checked.

Figure 4:
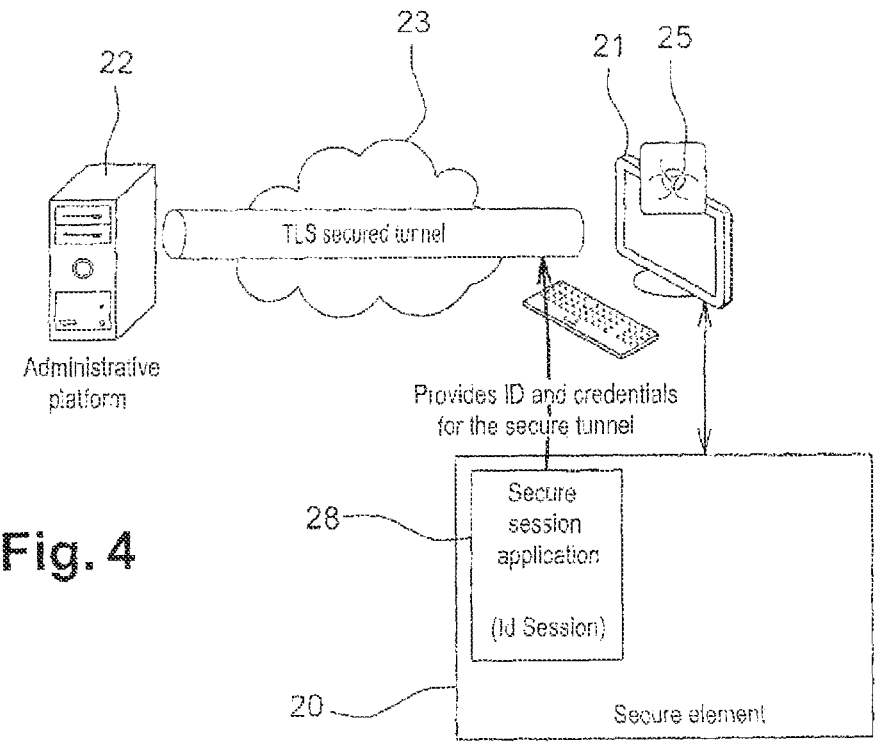
Figure 5:
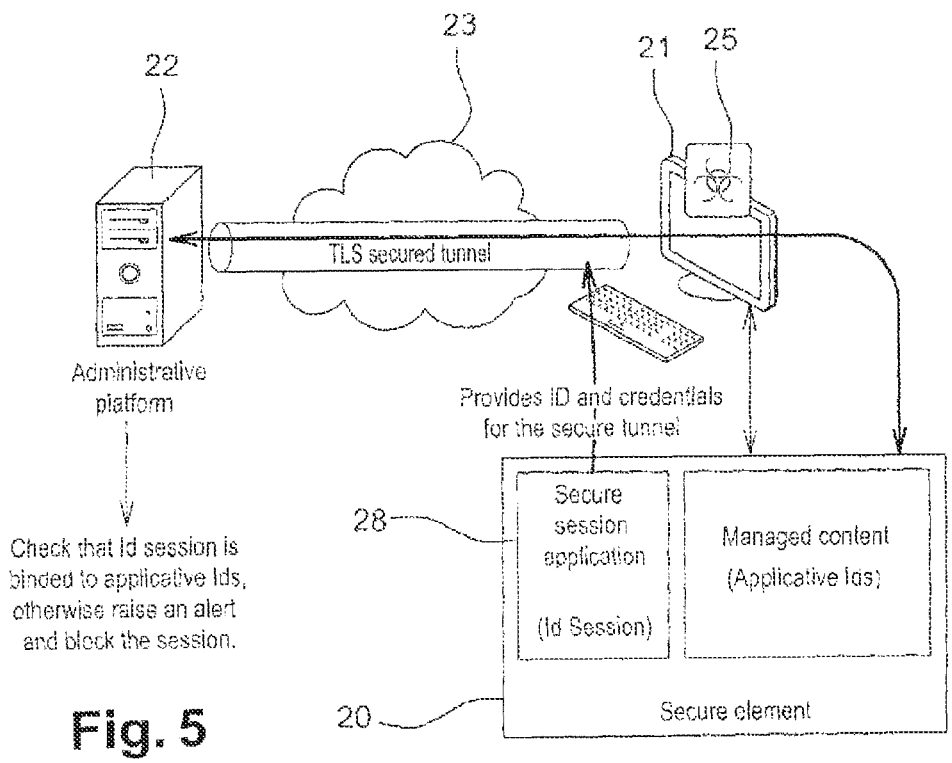

Like described in regard to FIGS. 4 and 5, the UICC reference can be used for securing the channel between the terminal 92 and the server 90 as described hereunder.

In the systems represented in FIGS. 4 and 5, an independent application is inserted in the secure element for securing the session between the administrative platform and the terminal. After this step, the server verifies the binding between the identity at the device session level and the identity at the secure element remote management.

FIG. 4 represents a first step of this method.

As can be seen, the secure element 20 comprises an application 28 foreseen to provide session keys to the administrative platform 22. These session keys are generated by the application 28 and transmitted to the mobile equipment 21. The application 28 transmits also an identifier or a certificate to the mobile equipment 21:
 An identifier is sent from the application 28 to the equipment when a symmetrical encryption is used (on the basis of secret keys) for creating a secure channel between the platform 22 and the equipment 21. The equipment 21 transmits this identifier to the platform 22. The platform 22 then compares the received identifier with identifiers it stores, in order to recognize which application sent the identifier. Once recognized, the platform 22 associates a symmetrical key to the identifier of the application 28. The application 28 and the platform 22 then derive session keys in order to encrypt (for confidentiality reasons) and maintain the integrity of the communication between the equipment 21 and the platform 22. A secure channel has thus been established between the equipment 21 and the platform 22 (examples of such protocols are standardized by Global Platform, PSK-TLS can also be used).
 Another way to create this secure channel consists in exchanging certificates between the platform 22 and the application 28. The platform authenticates the application 28 by asking it to sign a hash of all the messages already exchanged. The equipment 21 generates a session key and encrypts it for the platform 22. A secured communication (one example of such a standardized is TLS) is then established between the equipment 21 and the platform 22.

In both of the preceding cases a secure channel has been established between the platform and the equipment 21.

The main second step of this method consists in verifying the binding between the identity at the device session level and the identity at the secure element remote management.

FIG. 5 represents this step.

A request to manage content of the secure element is sent to the administrative platform. This management consists for example in downloading content on the secure element 20, deleting or exporting content stored on it or activating or deactivating content stored on it. The download of content can for example consist in downloading an entire Sim application on the secure element, with the associated credentials (IMSI, Ki). It can also consist in downloading a phone book in the secure element 20 from the platform 22.

In order to verify this binding, the secure element 20 sends through the established secure channel a fixed identifier, like for example his ICCID or his serial number. The platform 22 verifies that this request originates from the same secure element (for example the session keys used for establishing the secure channel are compared to the fixed identifier). If the check is positive, the management is authorized. On the contrary, if the check is negative, the management is forbidden.

The invention ensures that the secure element that is managed is the correct one and not another secure element linked to the platform by a malware.

The server 90 can be managed by a unique entity, like for example a card manufacturer, who knows what is stored on each card.

The invention claimed is:

1. Method for downloading a second subscription from a second operator to a universal integrated circuit card (UICC) embedded in a terminal, a first subscription of a first operator being present on said UICC, said method comprising:

transmitting from said terminal to a platform an identifier and a request for downloading said second subscription from said second operator;

verifying in said platform that said terminal is authorized by said first operator to download said second subscription by verifying the rights of said terminal in accordance with its identifier; and downloading said second subscription to said UICC if said rights are confirmed and, otherwise, refusing to download said second subscription.

2. Method according to claim 1, wherein said verification comprises comparing said identifier with a list of subscriptions for which a download is authorized.

3. Method according to claim 1, wherein said identifier is an identifier of said terminal.

4. Method according to claim 1, wherein said identifier is an identifier of said UICC.

* * * * *